US010639859B2

(12) United States Patent
Delorme et al.

(10) Patent No.: US 10,639,859 B2
(45) Date of Patent: May 5, 2020

(54) DRUM FOR PRODUCING A TIRE, PROVIDED WITH RETRACTABLE SECTORS

(71) Applicants: Jean-Claude Delorme, Clermont-Ferrand (FR); Dominique Leblanc, Clermont-Ferrand (FR); Michel Druet, Clermont-Ferrand (FR)

(72) Inventors: Jean-Claude Delorme, Clermont-Ferrand (FR); Dominique Leblanc, Clermont-Ferrand (FR); Michel Druet, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 593 days.

(21) Appl. No.: 14/908,300

(22) PCT Filed: Jul. 23, 2014

(86) PCT No.: PCT/FR2014/051915
§ 371 (c)(1),
(2) Date: Jan. 28, 2016

(87) PCT Pub. No.: WO2015/015096
PCT Pub. Date: Feb. 5, 2015

(65) Prior Publication Data
US 2016/0159023 A1 Jun. 9, 2016

(30) Foreign Application Priority Data
Aug. 1, 2013 (FR) ...................................... 13 57679

(51) Int. Cl.
*B29D 30/24* (2006.01)
*B29D 30/12* (2006.01)
*B29D 30/26* (2006.01)

(52) U.S. Cl.
CPC ........... *B29D 30/242* (2013.01); *B29D 30/12* (2013.01); *B29D 30/24* (2013.01); *B29D 30/26* (2013.01);
(Continued)

(58) Field of Classification Search
CPC ...... B29D 30/20; B29D 30/24; B29D 30/242; B29D 2030/2657; B29D 2030/2664;
(Continued)

(56) References Cited

U.S. PATENT DOCUMENTS 1,479,005 A * 1/1924 Pearson ................. B60B 30/00
156/417
1,669,532 A 5/1928 Myers
(Continued)

FOREIGN PATENT DOCUMENTS

CN 2389779 Y 8/2000
CN 2521029 * 11/2002 ............. B29D 30/24
(Continued)

OTHER PUBLICATIONS

Machine generated English language translation of JP 08-71856 (original document dated Mar. 1996) (Year: 1996).*
(Continued)

*Primary Examiner* — Robert C Dye
*Assistant Examiner* — Sedef E Paquette
(74) *Attorney, Agent, or Firm* — Dickinson Wright PLLC

(57) ABSTRACT

A drum for building a green tire casing having:
sectors that form a circumferential face of the drum, and at least one cam for controlling a radial movement of the sectors with respect to a rotation axis of the drum.
(Continued)

The cam has two main faces and is designed such that a monotonous movement of the cam first of all causes the radial movement of some of the sectors by virtue of ramps situated on its first face without modifying a radial position of the other sectors, and then causes the radial movement of the other sectors by virtue of ramps situated on its second face, the movement of all of the sectors then being simultaneous.

11 Claims, 14 Drawing Sheets

(52) U.S. Cl.
CPC .............. *B29D 2030/265* (2013.01); *B29D 2030/2642* (2013.01); *B29D 2030/2657* (2013.01)

(58) Field of Classification Search
CPC .. B29D 30/244; B29D 30/245; B29D 30/246; B29D 30/26; B29D 2030/2642; B29D 2030/265; B29K 2105/25
USPC .............................. 156/110.1, 414, 415, 417
See application file for complete search history.

(56) References Cited

U.S. PATENT DOCUMENTS

| | | | |
|---|---|---|---|
| 3,485,700 A | 12/1969 | Cooper et al. | |
| 3,576,693 A | 4/1971 | Pacciarini | |
| 3,779,835 A * | 12/1973 | Lohr | B29D 30/24 156/417 |
| 3,867,231 A | 2/1975 | Casey | |
| 4,772,351 A * | 9/1988 | Thompson | B29D 30/24 156/417 |
| 5,320,701 A | 6/1994 | Jellison et al. | |
| 2003/0029573 A1* | 2/2003 | Franke | B29D 30/48 156/422 |
| 2004/0216831 A1 | 11/2004 | Reding | |
| 2012/0024464 A1* | 2/2012 | Marchini | B29D 30/0016 156/110.1 |

FOREIGN PATENT DOCUMENTS

| | | | | |
|---|---|---|---|---|
| CN | 1410256 A | | 4/2003 | |
| JP | 50-157477 | * | 12/1975 | |
| JP | 61-134234 | * | 6/1986 | ............ B29D 30/36 |
| JP | 08-71856 | * | 3/1996 | ............ B23P 13/00 |
| KR | 10-2010-0021827 | * | 2/2010 | ............ B29D 30/24 |
| WO | 2013/054051 | | 4/2013 | |

OTHER PUBLICATIONS

Machine generated English language translation of WO 2013/054051 (origininal document dated Apr. 2013) (Year: 2013).*
Machine generated English language translation of KR 10-2010-0021827 (original document dated Feb. 2010) (Year: 2010).*
Machine generated English language translation of CN 2521029 (original document dated Nov. 2002) (Year: 2002).*
Machine generated English language translation of JP 50-157477 (original docu,emt dated Dec. 1975) (Year: 1975).*
Machine generated English language translation of JP 61-134234 (original document dated Jun. 1986) (Year: 1986).*
An English-Language Translation of the Written Opinion of the International Searching Authority issued in PCT/FR/2014/051915 dated Dec. 19, 2014.
International Search Report for Priority Application PCT/FR2014/051915 dated Dec. 19, 2014.

* cited by examiner

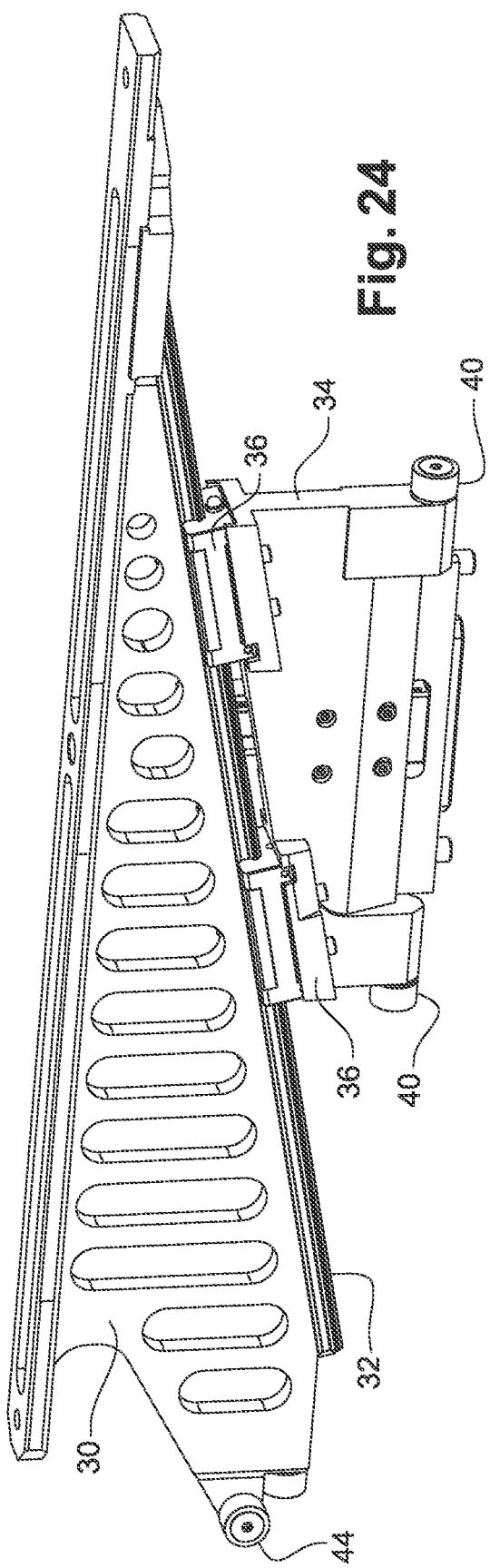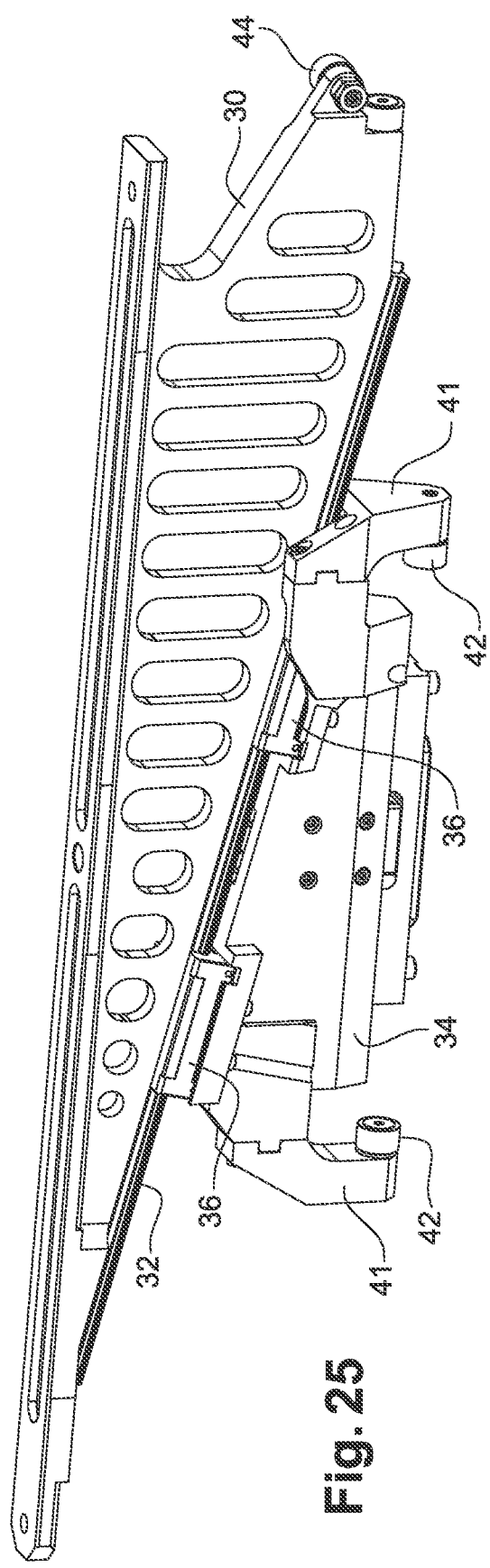

DRUM FOR PRODUCING A TIRE, PROVIDED WITH RETRACTABLE SECTORS

This application is a 371 national phase entry of PCT/FR2014/051915, filed 23 Jul. 2014, which claims benefit of French Patent Application 1357679, filed 1 Aug. 2013, the entire contents of which is incorporated by reference for all purposes.

BACKGROUND

1. Field

The disclosure relates to tires and in particular to the production of green tire casings.

2. Description of Related Art

The elements that form the tread of a green tire casing for a wheel are assembled on a tire-building drum, also known as a crown form. These elements mainly comprise raw rubber. Once assembled, the tread is removed from the drum and deposited on a carcass produced separately. The joining of the two forms a tire. After the latter has been shaped, a green form is obtained, this then being cured in order to vulcanize the rubber.

Application WO 2013/054051 in the name of the applicants discloses a drum which comprises primary and secondary sectors that form its circumferential face. These sectors are able to move in the radial direction with respect to the rotation axis of the drum so as to make it possible to remove the tread once the latter has been produced and also to adapt the diameter of the drum in accordance with that of the tread to be built. The primary sectors are also able to move in the axial direction with respect to the secondary sectors. Thus, when an increase in the diameter of the drum is desired, all of the sectors are moved away from the axis and then the secondary sectors are moved towards the primary sectors in the axial direction in order to fill the spaces that have arisen between the primary sectors and to restore the continuity of the circumferential face in order for it to serve as a support for the elements of the tread.

When removal of the produced tread from the drum is desired, some of the sectors are moved towards the axis in order to form spaces between the other sectors that have remained stationary. It is then possible to take hold of the tread by introducing gripping means into the spaces that have thus arisen. Next, all of the sectors are moved in the radial direction so as to entirely free the tread with respect to the drum. This is the collapsing operation.

To this end, the control mechanism for the sectors comprises a first cam that is able to move some of the sectors and a second cam that is able to move the others. An actuator makes it possible to turn one of the cams with respect to the other and thus, at the start of the process, to move the first sectors towards the axis without moving the others.

However, this drum is open to improvement. Specifically, the control of the sectors during the above process first of all requires that the actuator is controlled in order to turn one cam with respect to the other and then that another actuator that simultaneously moves the two cams is controlled. It is thus relatively complicated to control the drum in order to free the tread. In addition, the mechanism is for its part also complex.

A drum having two types of sectors, wide and narrow, that are mounted so as to be able to move in the radial direction is also known, from U.S. Pat. No. 3,867,231, said sectors being moved by the rotation of a cam which has two types of grooves that respectively ensure the movement of the narrow sectors and of the wide sectors.

This drum has twelve sectors, which can appear to be an insufficient number of elements for ensuring the surface continuity. Specifically, with such a small number of sectors, the discrepancies in geometry of the circumferential surface over the drum diameter adjusting range can be significant and result in defects relating to the uniformity of the manufactured tire casing. In order to compensate for this lack of surface continuity, it is necessary either to reduce the extent of the diameter adjusting range, thereby making the drum less useful, or to increase the number of sectors. However, with this latter solution, the difficulty is that of being able to control all the sectors, the cams having limited space for accommodating ramps, each ramp being connected to a given sector.

SUMMARY

One aim of the embodiments of the invention is to simplify the process and the mechanism for freeing the tread.

Another aim of the embodiments of the invention is to propose a mechanism for controlling a relatively large number of sectors.

To this end, according to an embodiment of the invention, provision is made of a drum for building a green tire casing, which has:
  sectors that form a circumferential face of the drum, and
  at least one cam for controlling a radial movement of the sectors with respect to a rotation axis of the drum,
  the cam having two main faces and being designed such that a monotonous movement of the cam first of all causes the radial movement of some of the sectors by virtue of ramps situated on its first face without modifying a radial position of the other sectors, and then causes the radial movement of the other sectors by virtue of ramps situated on its second face, the movement of all of the sectors then being simultaneous.

It will be recalled that a monotonous function is a function in which the direction of variation does not change. Over a given period of time, it is thus an increasing function or a decreasing function, but not both at the same time. Thus, the expression "monotonous movement" is understood as meaning that the movement of the cam does not change direction.

Therefore, it is the same member and the same movement of the latter, without changing direction, which controls the two phases of the movement of the sectors. It is thus particularly easy to control the retraction of the sectors. In addition, the two faces of the cam make it possible to control a large number of sectors from a single member.

Advantageously, the sectors comprise sectors of a first type and sectors of a second type that are able to bear in the radial direction against the sectors of the first type, the cam being designed such that the sectors of the first type are moved by virtue of the ramps situated on the first face of the cam, the sectors of the second type being moved by virtue of the ramps situated on the second face of the cam.

Preferably, the drum is designed such that, after they have started to be moved by the cam, the sectors of the first type are received in depressions formed in the sectors of the second type.

It is thus possible to reduce the retraction travel of the sectors and thus the cycle times.

In one embodiment, some of the ramps that are able to control the movement of some sectors have a portion in the form of an arc of a circle that is coaxial with a rotation axis of the cam.

This coaxial portion does not cause any radial movement of the corresponding sectors when it is covered by a follower member connected to the sectors.

Provision can be made for there to be at least two of the cams.

Advantageously, at least some of the sectors, and preferably all of the sectors, are mounted in a movable manner with respect to the support in a predetermined direction that is not radial with respect to the rotation axis and intersects the latter.

This way of moving the sectors makes it possible to simplify the geometric definition thereof and to reduce the energy to be supplied for the relative movements thereof, while obtaining a virtually continuous working surface.

In one embodiment, the drum comprises at least one set of equipment that is mounted in a sliding manner with respect to the support in the direction of the rotation axis and is connected to a plurality of the sectors.

Preferably, the drum is designed such that the sectors are contiguous in the circumferential direction.

Advantageously, each sector has two flat main side faces that are designed to be located next to homologous faces of the adjacent sectors.

Advantageously, the sectors can have a non-stick external surface treatment.

Thus, since the rubber laid on the surface of the drum is hot, the treatment of this surface makes it easier to subsequently remove it.

The fact that these faces are flat facilitates their geometric definition and manufacture.

Provision can be made for at least some of the sectors, and preferably all of the sectors, to have an outer face that has a contour with a trapezoidal overall shape.

According to an embodiment of the invention, provision can also be made of a method for manufacturing a tire casing, in which at least a part of a tread of a green form of the casing is assembled on a drum according to the invention.

BRIEF DESCRIPTION OF DRAWINGS

An embodiment of the invention will now be described by way of non-limiting example with reference to the appended drawings, in which:

FIGS. 22 to 25 are perspective views illustrating the connection of the sectors to the support;

DETAILED DESCRIPTION OF SPECIFIC EMBODIMENTS

Figure 1:
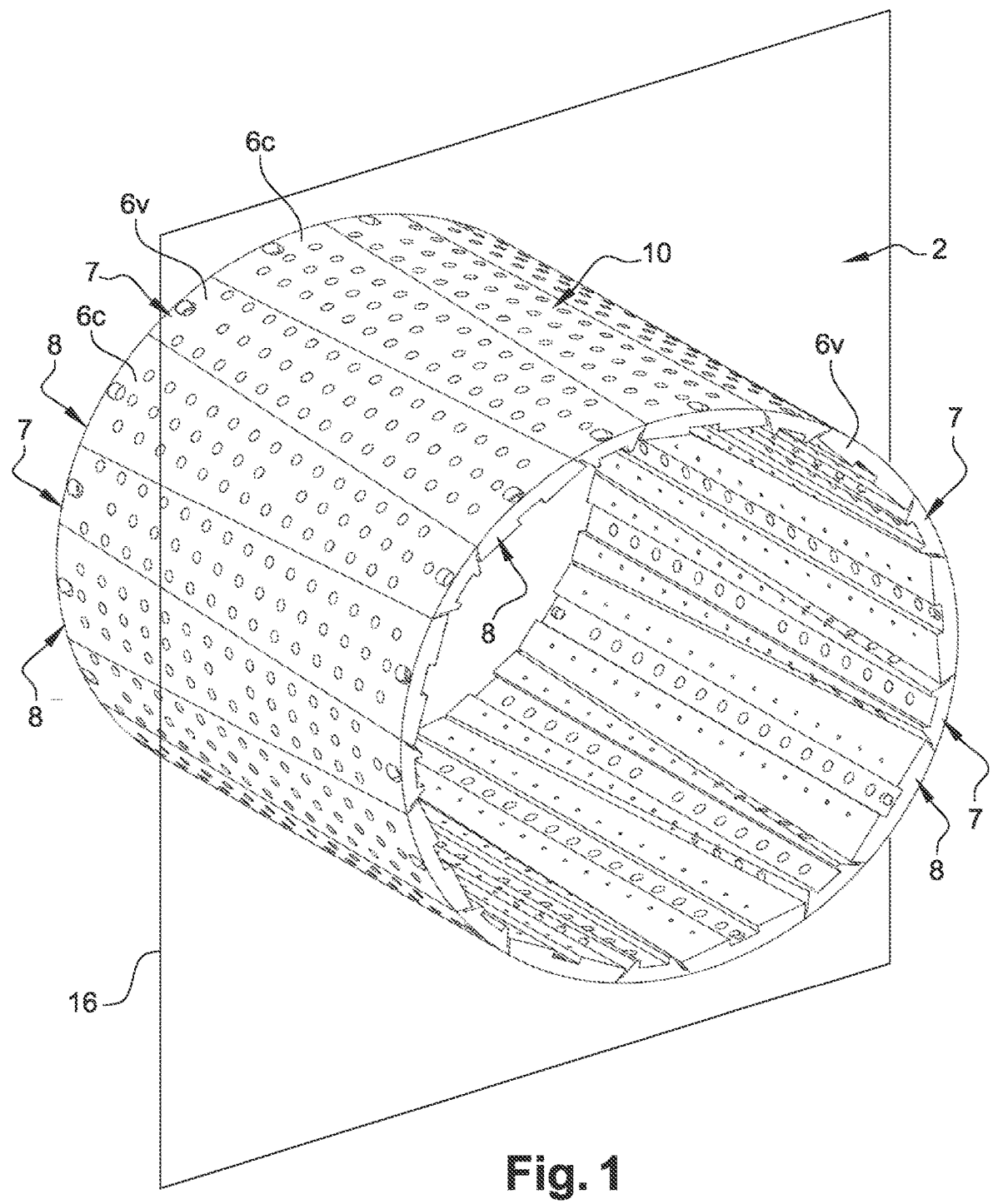
FIGS. 1 to 3 are perspective views illustrating three configurations of the sectors of the drum in one embodiment of the invention.

FIG. 1 illustrates a drum 2 according to one embodiment of the invention. This drum is used for assembling the elements that form a tread for a green form of tire. The tire is intended for a vehicle wheel which may be a utility vehicle, a vehicle of the light type, a passenger vehicle, a vehicle of the heavy goods type or, alternatively, a civil engineering vehicle.

Figure 19:
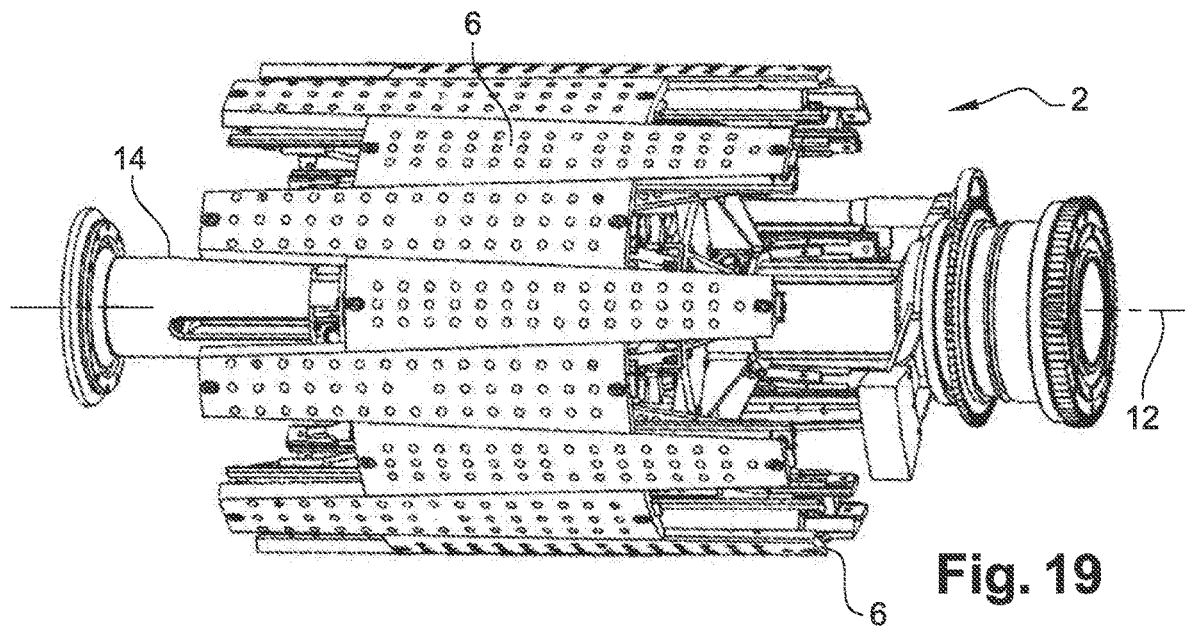
FIGS. 19 and 20 are perspective views of the drum and of the two types of sector, respectively.

The drum comprises a support 14 which is illustrated in particular in FIG. 19 and has an overall shape exhibiting symmetry of revolution of axis 12, which forms the rotation axis of the drum. Throughout the following text, unless indicated otherwise, the axial direction denotes a direction parallel to the axis 12 and the radial direction denotes any desired direction that is radial thereto, that is to say which is perpendicular thereto and which thus intersects this axis.

In the case of a tool for assembling a crown for a green tire form, the surface of this tool is virtually continuous, has a variable diameter and allows in particular the construction of a tread by successively stacking strips of raw rubber laid in the hot state. To this end, it has a non-stick surface treatment for allowing the hot rubber to be laid and for facilitating its subsequent removal. The circumferential face of the drum is in particular free of reliefs or recesses in the form of steps, which are often encountered in prior art drums. This avoids the deformation of the strips of rubber and manufacturing defects such as the blisters that arise during curing.

The drum 2 has sectors 6c, 6v which extend at the periphery of the support 14 so as to form the circumferential face 10 of the drum which forms the working face on which the tread elements are disposed. This face 10 has, in this case, a cylindrical overall shape with a circular section in a plane perpendicular to the axis 12. Thus, the drum forms in this case what a person skilled in the art often refers to as a "flat shape".

As will be seen below, one of the features of this drum is that the sectors are mounted so as to move in a linear direction that is inclined with respect to the axis 12 and intersects this axis without being perpendicular thereto. During this movement, each sector follows a rectilinear path with respect to the axis, thereby making it possible to simplify the definition and machining of the faces of each sector, in particular the side faces thereof that are in contact with one another, and also the mechanism for guiding the sectors. In particular, as will be seen, the side faces are flat, making them more easily machinable.

There are 18 sectors 6c, 6v in this case, but this number could vary. Each sector has a plane of symmetry in which the axis 12 is inscribed. It has a cylindrical external face 10 having contours with a trapezoidal overall shape. These contours are delimited by four flat faces, specifically two end faces 7 and 8, the face 7 being shorter than the face 8 in the circumferential direction, and two side faces 9. The faces 7 and 8 are perpendicular to the axis 12.

In this case, two types of sectors are distinguished. The sectors 6c of the first type are known as "key sectors" and the sectors 6v of the second type are known as "arch sectors". These two types of sectors thus form two respective subassemblies. All of the sectors of the first type are identical to one another. The same goes for the sectors of the second type. In the circumferential direction with respect to the axis 12, the sectors of the first type are disposed in alternation with those of the second type but are arranged head to tail with respect thereto.

Figure 5:
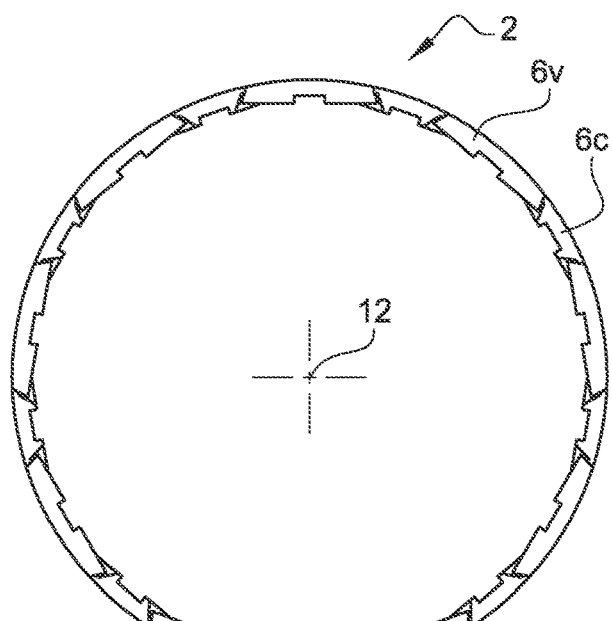
FIGS. 5 to 7 are cross-sectional views of the sectors showing three configurations of the drum during the collapsing operation.

As illustrated in FIGS. 1 and 5, the drum is designed such that the sectors can come into mutual contact in the circumferential direction by way of their side faces 9. Each sector thus comes into contact with the two adjacent sectors in the series. Since the key sectors and arch sectors alternate regularly, each key sector is contiguous with two arch sectors and vice versa.

In addition, the side faces 9 are inclined such that each key sector bears in the direction of the axis on the two adjacent arch sectors. During the construction of the tread, radial stress exerted on this sector is thus transferred to the two adjacent arch sectors.

The sectors can be moved with respect to one another in order to modify the diameter of the face 10. The smallest-diameter and largest-diameter configurations of the drum have been illustrated in FIGS. 2 and 3, respectively, FIG. 1 showing its mean-diameter configuration.

Figure 2:
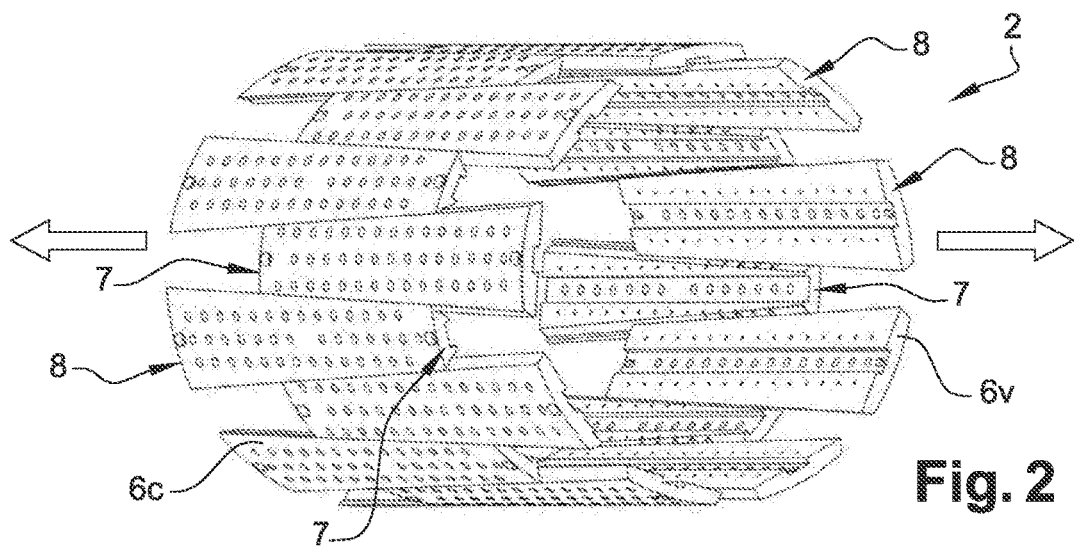

In FIG. 2, the distance between the small end faces 7 of the subassemblies is shorter than the distance between their large end faces 8. It is thus the case that the sectors of each subassembly project from those of the other subassembly in the axial direction by way of their large ends 8. The continuous circumferential surface provided for the production of the tread is delimited by the small faces 7.

Figure 3:
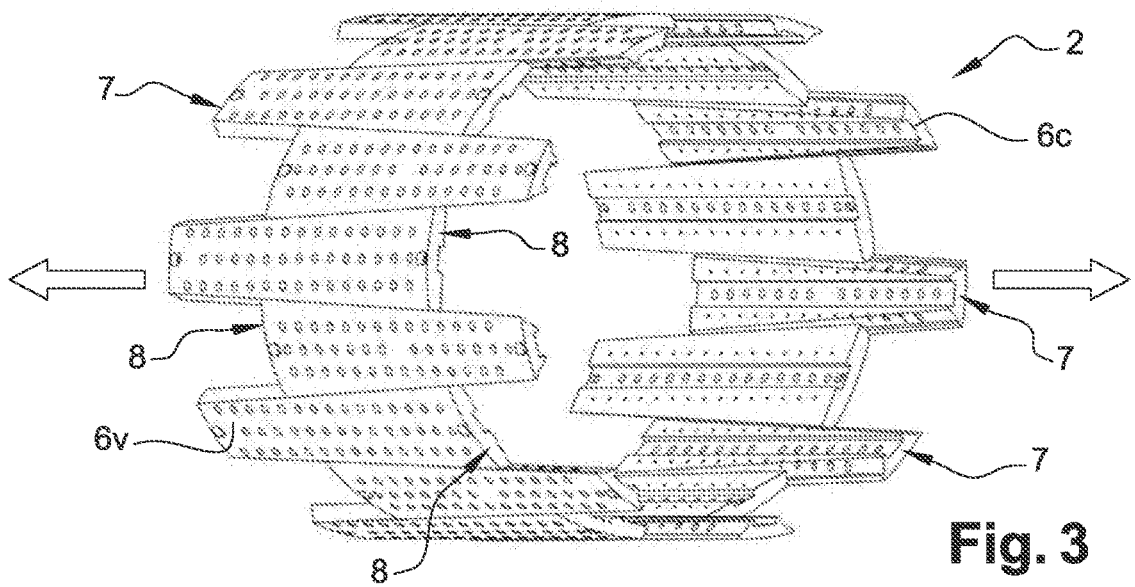

In the configuration in FIG. 3, the exact opposite is the case.

In the configuration in FIG. 1, the small ends 7 of the sectors of any one of the subassemblies extend in the same plane as the large end faces 8 of the sectors in the other subassembly. In this case, it is thus the entire external face 10 of the sectors which forms the working face of the drum. In this configuration, the drum is adjusted to its mean diameter, and the external face 10 is perfectly cylindrical.

The orientation of each side face 9 is judiciously chosen so as:
  to allow the radial movements that are necessary for expansion or collapsing of the tool;
  to allow the movement of the sectors that is necessary for adjusting the diameter of the tool;
  to allow the preservation of contact between the side faces 9, regardless of the chosen diameter in order to maintain the continuity of its external face as far as possible; and
  to limit the discrepancy in radial altitude between the chord and the arc of an ellipse at the outer edges of the sectors. As will be seen below, these edges are the result of the intersection between the outer cylindrical face of the sector and the planes of its side faces 9.

Two different mechanisms ensure the movements of each sector with respect to the support.

The first mechanism makes it possible to adjust the diameter of the tool while ensuring the required dimensional coverage. In this case, this diameter can be modified over a range of 100 mm.

Figure 4:
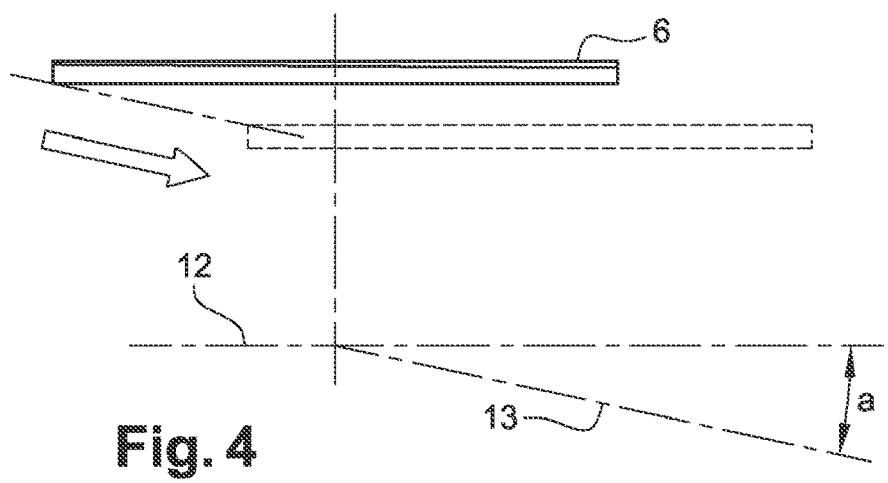
FIG. 4 is a diagram showing sliding of each sector.

During this adjustment, with reference to FIG. 4, starting from a configuration in which all the sectors extend the same distance from the axis 12, each sector 6c, 6v slides with respect to the support in a predetermined direction 13 that is not radial with respect to the axis 12 and intersects this axis. During this movement, the sector thus remains parallel to the axis 12. The angle a formed by this direction and the axis is the same for all the sectors, here.

In addition, this mechanism is designed such that any one of the sectors cannot be moved in this way with respect to the support without the other sectors also being moved with respect to the support in the predetermined directions inherent to said sectors. More specifically, when the sectors of any one of the subassemblies are moved in the direction 13 with respect to the support, this movement has a component along the axis that is oriented in a first direction and the sectors of the other subassembly are moved with a component along the axis that is oriented in a second, opposite direction with respect to the first direction. The key sectors are thus moved in a first direction along the axis and the arch sectors are moved in the opposite direction, their absolute speed being the same. At any time during the movement, the sectors thus all remain at the same distance from the axis 12.

At any time during this movement, the two subassemblies are mirror images of one another through axial symmetry. The axis of symmetry is perpendicular to the rotation axis 12. FIG. 1 illustrates the transverse median plane 16 of the drum, perpendicular to the axis 12. At any time during the movement, the small end faces 7 of all of the sectors extend at the same distance from this plane. The same goes for their large end faces 8.

The range of diameters to be covered and the width of the useful zone on the tool can be modified by varying the geometry of the side faces 9 combined with the value of the angle of the direction 13, and by varying the length of the sectors combined with their travel with respect to the median plane.

Figure 6:
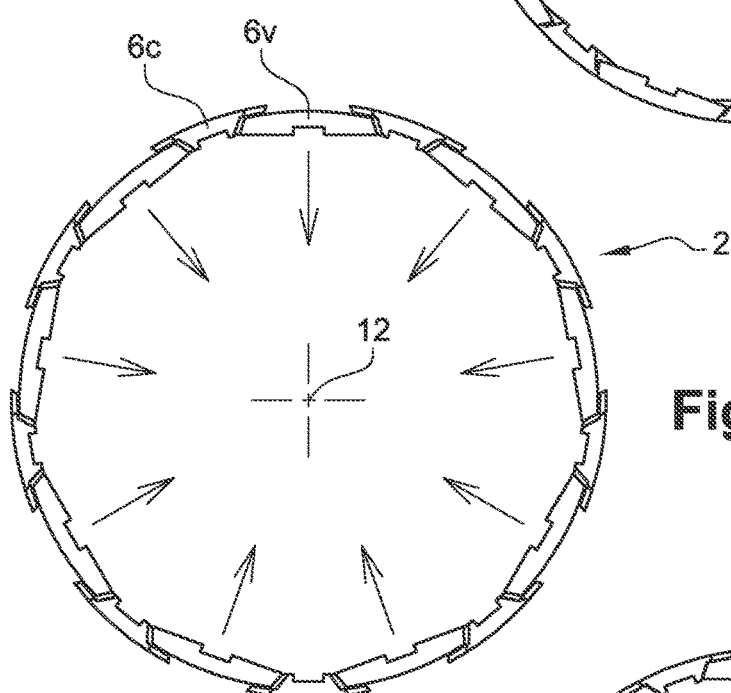
Figure 7:
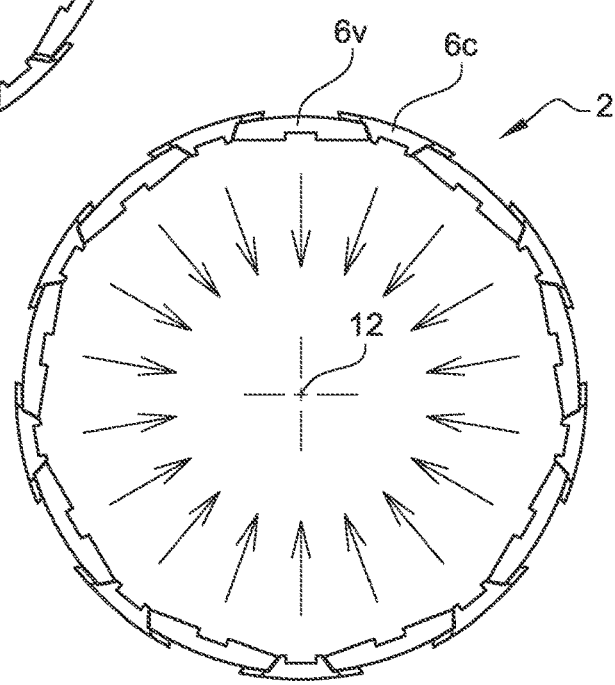

Moreover, the second mechanism is produced such that each sector is mounted so as to be able to move with respect to the support in a radial direction with respect to the axis 12. The sectors are thus able to move between two positions. The first position is a working position that makes it possible to construct the tread, the tool having the diameter chosen for this work, as illustrated in FIG. 5. The second position is a collapsed position of the tool that is obtained at the end of the radial movement of the sectors in the direction of the axis. This position makes it possible to detach the sectors with respect to the tread produced and to remove the tool from the interior thereof. More specifically, in this case, this mechanism is designed such that it first of all causes the movement of the arch sectors 6v in the direction of the axis without modifying the radial position of the key sectors 6c as illustrated in FIG. 6, and then causes the radial movement of all the sectors simultaneously, as illustrated in FIG. 7. Moreover, the key sectors have lateral depressions under their side faces 9, allowing them to receive a part of the adjacent arch sectors at the end of the first phase of movement. It will thus be seen that it is advantageous to provide an even number of sectors. In particular, since the arch sectors descend first and alternate with the key sectors, the latter form regularly distributed support zones for the tread which maintain its dimensional uniformity while awaiting its transfer to another station and during this transfer.

These two mechanisms will be explained in detail later. First of all, the geometric definition of the sectors will be explained.

Figure 8:
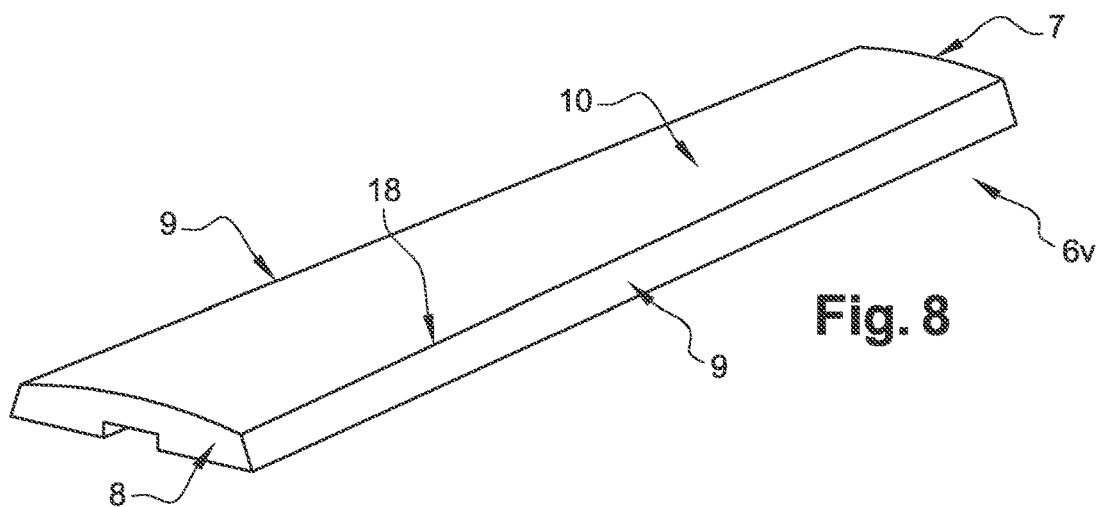
FIGS. 8 to 18 are views and diagrams illustrating the principle of the geometric construction of the side faces of the sectors.

As illustrated in FIG. 8, in the cylindrical circumferential outer face 10 of each sector, the diameter of the cylinder is chosen to correspond to the mean diameter of the range of variation in diameter to be covered with the tool, in order to limit the geometric discrepancies between this mean diameter and the minimum and maximum adjusted diameters of the drum.

Each side face 9 is inscribed in a plane inclined with respect to the axis 12, the two faces 9 of one and the same sector forming a wedge. Each edge 18 that forms the intersection between the face 10 and one of the faces 9 is thus an arc of an ellipse. FIG. 8 shows an arch sector, but the key sectors are defined in an analogous manner. The only difference resides in the orientation of the side faces 9, which run in the direction of the inside of the drum for the key sectors and in the direction of the outside for the arch sectors.

Figure 9:
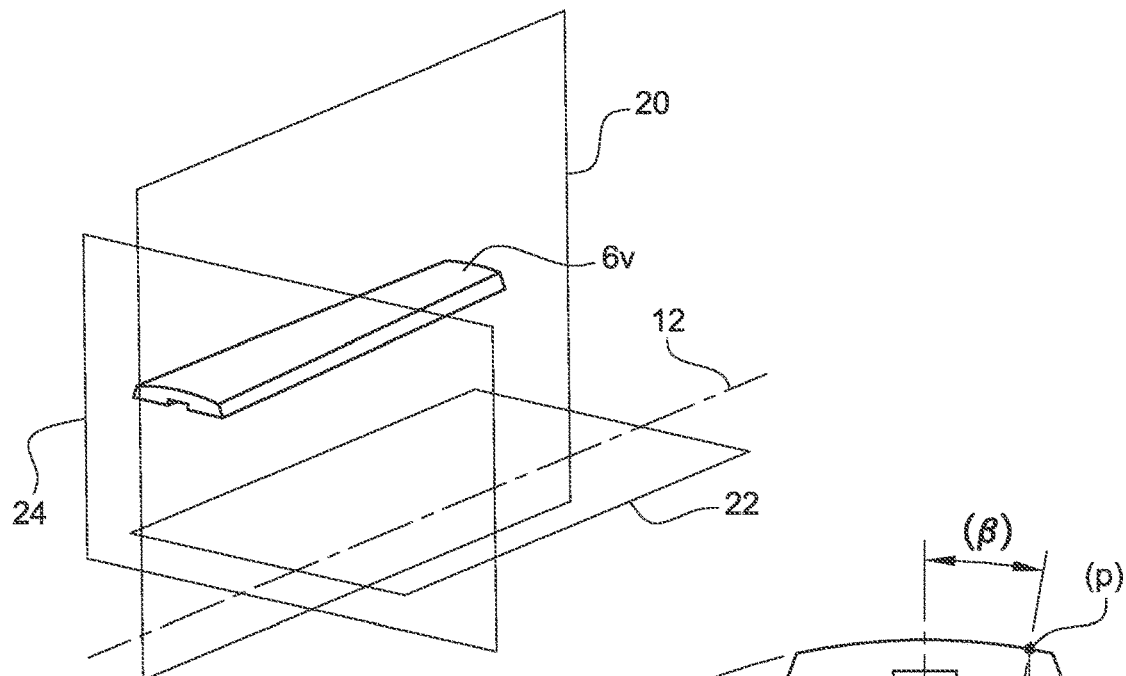

FIG. 9 illustrates the reference planes used to define the sector, namely the face plane 20 that passes through the axis 12 and forms the plane of symmetry of the sector, the right-hand plane 24, which is perpendicular to the axis 12, and the top plane 22, which is perpendicular to the two preceding planes.

The task is thus to determine the orientation of the plane of the face 9.

Figure 11:
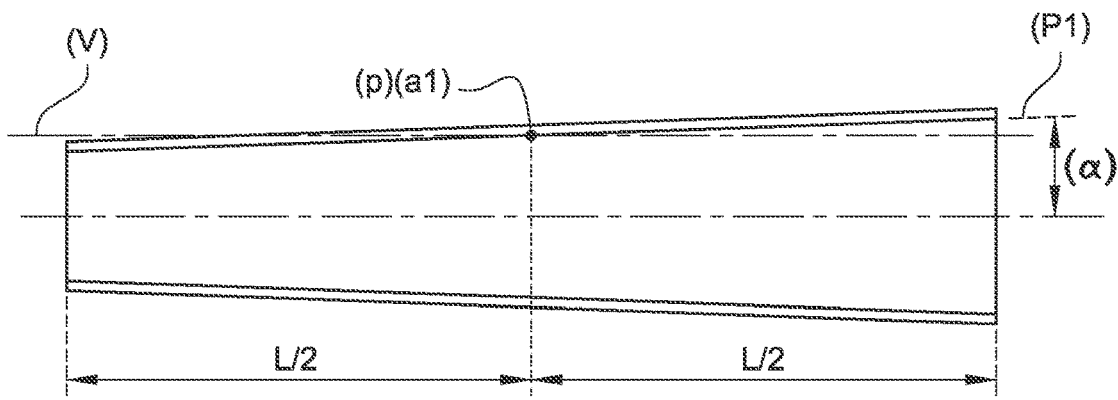
Figure 12:
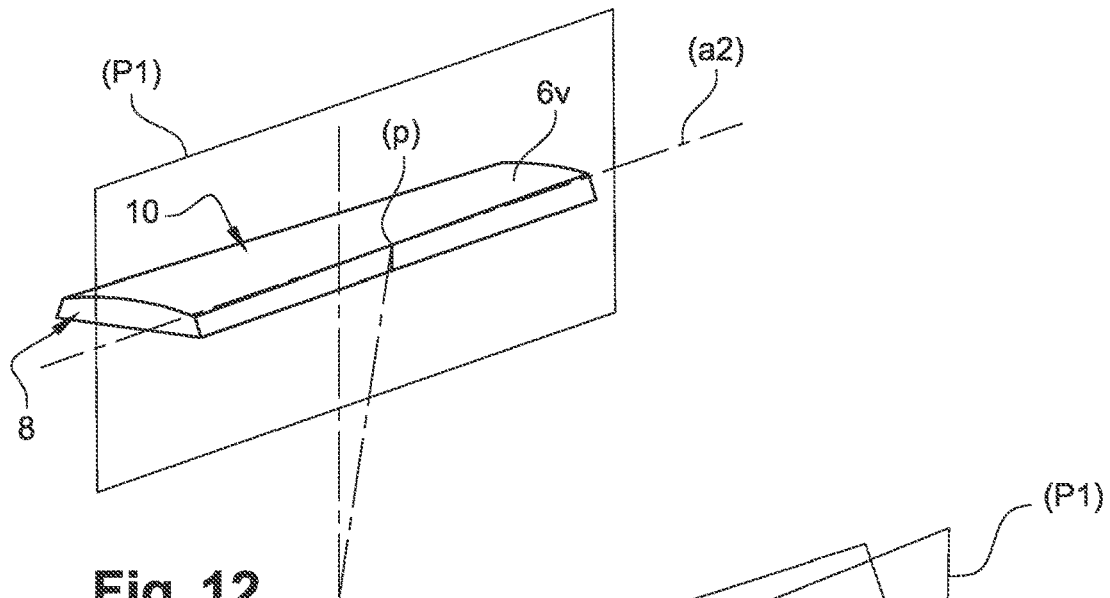

First of all, a point p of a generatrix of the cylinder of the face 10 is defined, this point passing through a radius R of a section of the cylinder and being located with respect to the face plane 20 at an angle β about the axis 12, this angle being equal to (360/N)/2, where N is the number of sectors. This point is situated at the middle of the length of the generatrix on the sector, as can be seen in FIGS. 11 and 12. In this case, N is 18 and β is 10°.

Figure 10:
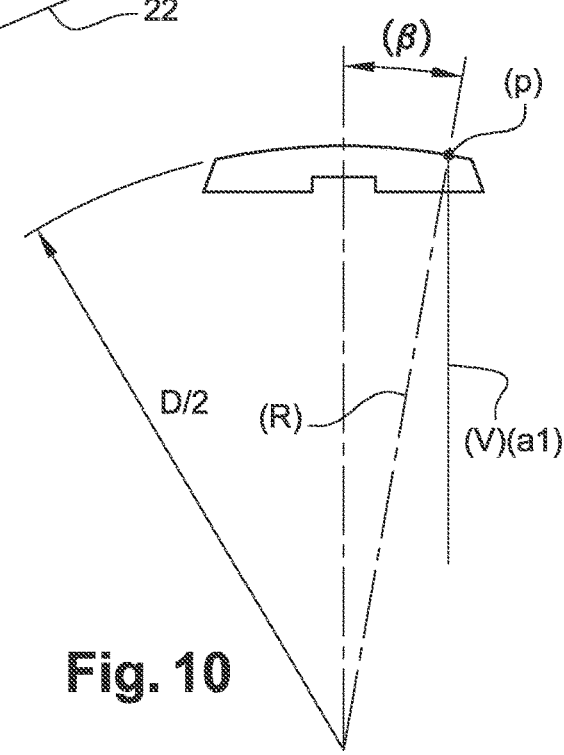

With reference to FIGS. 10 and 11, a plane V that is parallel to the face plane 20 and passes through the point p is then defined.

An axis a1 that is perpendicular to the axis 12, is situated in the plane V and passes through the point p is also defined.

A plane P1 is also defined as the image of the plane V by a rotation about the axis a1 through an angle α, as illustrated in FIG. 11.

With reference to FIG. 12, an axis a2 that is parallel to the top plane 22 and passes through the point p is defined in the plane P1.

Figure 13:
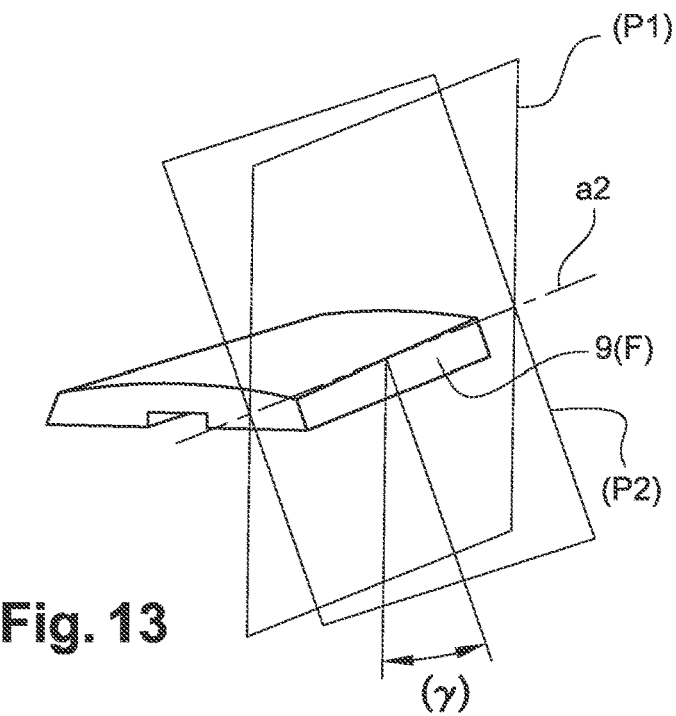

With reference to FIG. 13, a plane P2 is defined as being the image of the plane P1 by rotation about the axis a2 through an angle γ. The plane P2 is that of the side face 9.

The two rotations are carried out through respective angles of less than 90°. In this case, γ has been chosen to be equal to 20°.

The plane of the side face 9 thus results from a movement in translation from the radial plane that forms the longitudinal plane of symmetry of the sector, followed by a rotation about the axis a1 and a further rotation about the axis a2.

The faces 9 of the key sectors are thus defined in this way. Those of the arch sectors are defined using the same method through complementary angles such that, when the key sectors and arch sectors are assembled on the drum and the latter is in the working position, the faces 9 of the adjacent sectors are contiguous with one another.

Figure 14:
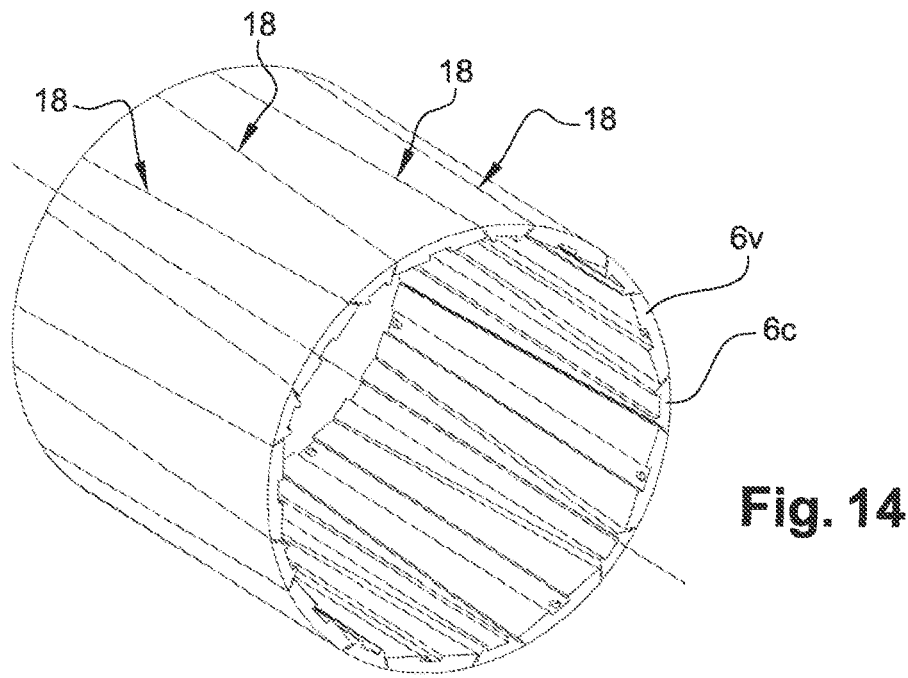

As illustrated in FIG. 14, when the sectors are positioned such that the outside diameter of the drum is identical to the machining diameter of the face 10, that is to say to the mean use diameter of the drum, it is as if the outer face of the drum were a cylinder cut into N sectors, the side faces 9 of which have been machined using the method described above with the aid of a zero-thickness saw blade. The edges 18 of the adjacent sectors are thus coincident and the surface continuity of the cylinder is theoretically perfect. The machining tolerances of the various components and the clearances necessary for the tool to operate introduce an alteration of this geometry of around a few hundredths of a millimetre.

Although, in this position adjusted to the mean diameter, the edges 18 of the adjacent sectors are perfectly coincident, this is no longer the case when the tool is adjusted to a different diameter. Specifically, the arc of an ellipse of the edge of a sector is defined by the intersection of the cylinder of mean, fixed diameter with the plane of the face 9, the position of which is geometrically fixed with respect to the axis of the cylinder. During the adjustment of the drum to a different diameter, the fictional arc of an ellipse resulting from the intersection of the new cylinder of the drum with the new position of the face 9 would have a different profile from that of the edge 18. In this new position, the edges 18, of which the profile is fixed by construction, can thus no longer be coincident with the face of the cylinder of new diameter. The surface continuity from one sector to another is thus more or less altered, by the value to which the outside diameter of the tool is adjusted and the angle α used for the construction of the sectors.

Steps are thus taken to minimize the offset between the edges 18 of two adjacent sectors by varying the angle α, which must be chosen to be small for the small tool diameters, so as to obtain a small curvature of the edge 18. The angle α could increase with the diameter of the face 10. Typically, in this example, α=2° for a range of variation in diameter of 100 mm, and tool diameters of between 500 and 700 mm.

The next task is to determine the angle a of the direction 13 of movement of the sectors with respect to the axis.

Figure 15:
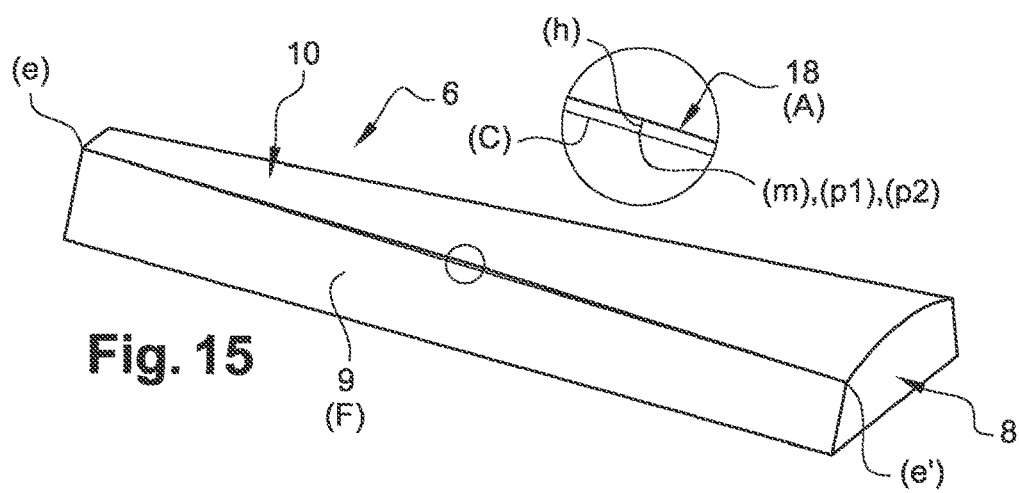

Efforts are made to keep the edges 18 of adjacent sectors as close as possible, without, however, being able to bring them into coincidence. In the method used here, the choice is made to keep the chords C of the edges 18 coincident instead, with reference to FIG. 15.

The alteration of the outer surface of the tool results from the offset in altitude between two edges 18 of adjacent sectors. The maximum of this distance can be evaluated as being the maximum height h between the arc 18 and its chord C in the plane of the face 9. Specifically, during the movement of two adjacent sectors along the path of angle a, starting from the mean diameter, any point p1 on the chord of one of the sectors, which is coincident at the start with the point p2 on the chord of the other sector, in the plane of the joining face, lifts radially and is moved symmetrically with respect to the median plane of the tool by the same radial value as the point p2. The ends of the chord of the edge 18 are denoted e and e'. Since the chords C are kept collinear during the movement, the maximum offset in altitude between the edges 18 of the two sectors will thus be found when the point a or the point e', in the direction of movement, is coincident with the middle m of the chord C of the adjacent sector. The maximum offset in altitude, in the plane of the face 9, will thus be equal to the height h.

Typically, in our construction, this offset is at most around 0.25 mm. Experience in manufacturing casings on a similar tool shows that an acceptable limit is around 0.3 to 0.4 mm between two consecutive sectors. Such values are compatible with conventional forces for strip rollering (around 1 daN/mm of roller width) and laying speeds ranging for example up to 400 metres per minute.

In order to determine the angle a, we seek to define the radial elevation of a sector during its movement in the direction 13, when the following conditions are met:

the key sector and arch sector are moved symmetrically with respect to the median plane of the tool, by the same radial value during the movement, and remaining parallel to the axis 12;

the faces 9 of the consecutive sectors are in contact at all working positions, and the chords C of two joined sectors remain collinear.

Figure 16:
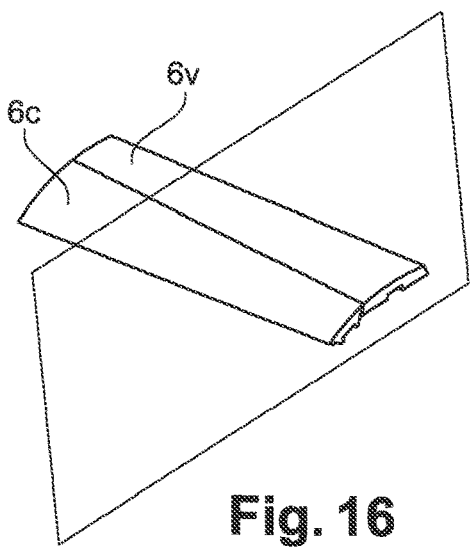
Figure 17:
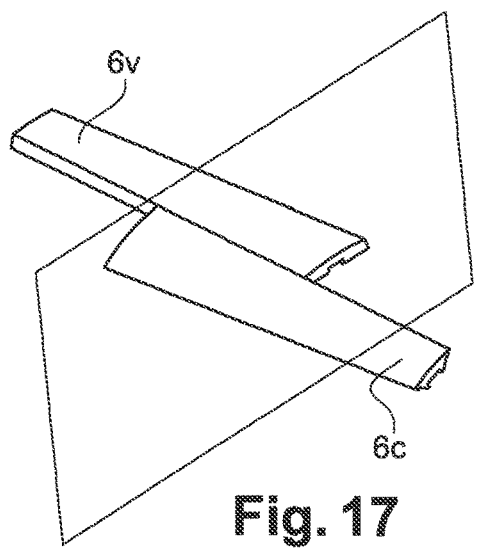

These conditions can be expressed in two particular positions that are illustrated in FIGS. 16 and 17, respectively:
- during the adjustment of the tool to the machining diameter of the sectors (starting position), that is to say to the position of mean diameter, and
- in the position in which the end e or e' of a sector is positioned at the middle of the chord of the adjacent sector (end position), i.e. at the minimum or maximum diameter of the drum.

Figure 18:
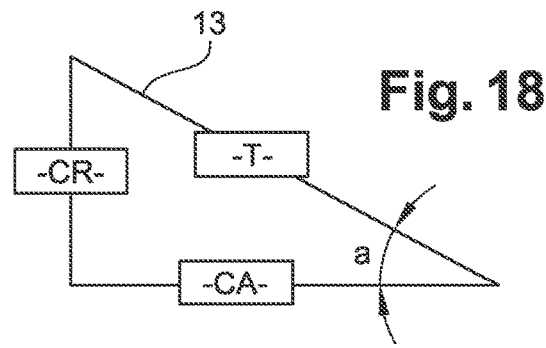

In these two positions, conventional trigonometric calculations make it possible to define the Cartesian coordinates of particular points of the sectors and ultimately the radius of the tool in the second position. It then suffices to solve the triangle illustrated in FIG. 18, in which the radial travel CR and the axial travel CA of the sector when it travels along its inclined path of length T are shown. In this case, the axial travel is equal to a quarter of the length of the sector.

The angle a is thus obtained by: $a=\text{arctg}(CR/CA)$.

For a given angle $\alpha$, the offset in radial altitude between two sectors, during the adjustment to minimum or maximum development positions, is all the smaller, the larger the mean diameter of the tool, which corresponds to the machining diameter D of the sectors, is. Specifically, during the increase in diameter D, the height h decreases, since the arc of an ellipse of the edge 18 flattens.

It would thus be possible to use this property during the design of larger diameter tools: to obtain an offset in altitude between sectors that is more or less constant regardless of the diameter D, the angle $\alpha$ would be increased.

This method has a positive effect on the mass and inertia of the tool, since:
- by increasing $\alpha$, it is necessary to increase a;
- for a constant elevation, the axial travel decreases;
- the length of the sectors that is necessary for one and the same range of useful width of the tool decreases; and
- the sectors are thus lighter.

The mechanism of the drum will now be described in detail with reference to FIGS. 21 to 31.

The support 14 is formed in this case by a shaft body of axis 12 and having a cylindrical overall shape. Apart from when the drum is set in rotation during the production of a tread, this shaft body is fixed. The drum comprises angle brackets 30 associated with the respective sectors. Each angle bracket is rigidly fixed to the corresponding sector and has the overall shape of a right-angled triangle, the longest side of the angle bracket contiguous to its right angle is the one to which the sector is fixed. The hypotenuse of the angle bracket forms a rail or ramp 32. It has an elongate rectilinear shape, its orientation with respect to the axis 12 corresponding to the abovementioned sliding direction a of the sector. Just like the sectors, the angle brackets associated with the key sectors are disposed head to tail compared with those associated with the arch sectors.

Each angle bracket carries, in the vicinity of the right angle, a roller 44 that is mounted so as to be free to rotate with respect to the angle bracket about an axis perpendicular to the overall radial plane of the angle bracket. The rollers 44 associated with the key sectors extend generally in one and the same plane perpendicular to the axis 12. Those associated with the arch sectors also extend in one and the same plane, different from the other plane.

The drum also comprises sector holders 34 that have, at their top, two gliders 36 that are engaged with the rail 32 such that the angle bracket is mounted so as to be able to slide on the sector holder. The gliders have a female profile complementary to the male profile of the ramp.

The drum also comprises mounting plates 38 that are rigidly fixed to the shaft body 14 and extend in a radial direction from the latter. Each sector holder is mounted so as to be able to slide radially on the corresponding mounting plate by way of suitable means that are not described in detail.

As illustrated in FIGS. 24 and 25, each sector holder has two rollers 40, 42. The rollers 40 associated with the arch sectors are disposed at the ends of the sector holder, while the rollers 42 associated with the key sectors are carried by arms 41 of the sector holder and face the body of the latter. All of the rollers are mounted so as to be free to rotate with respect to the sector holder about an axis parallel to the axis 12.

Figure 28:
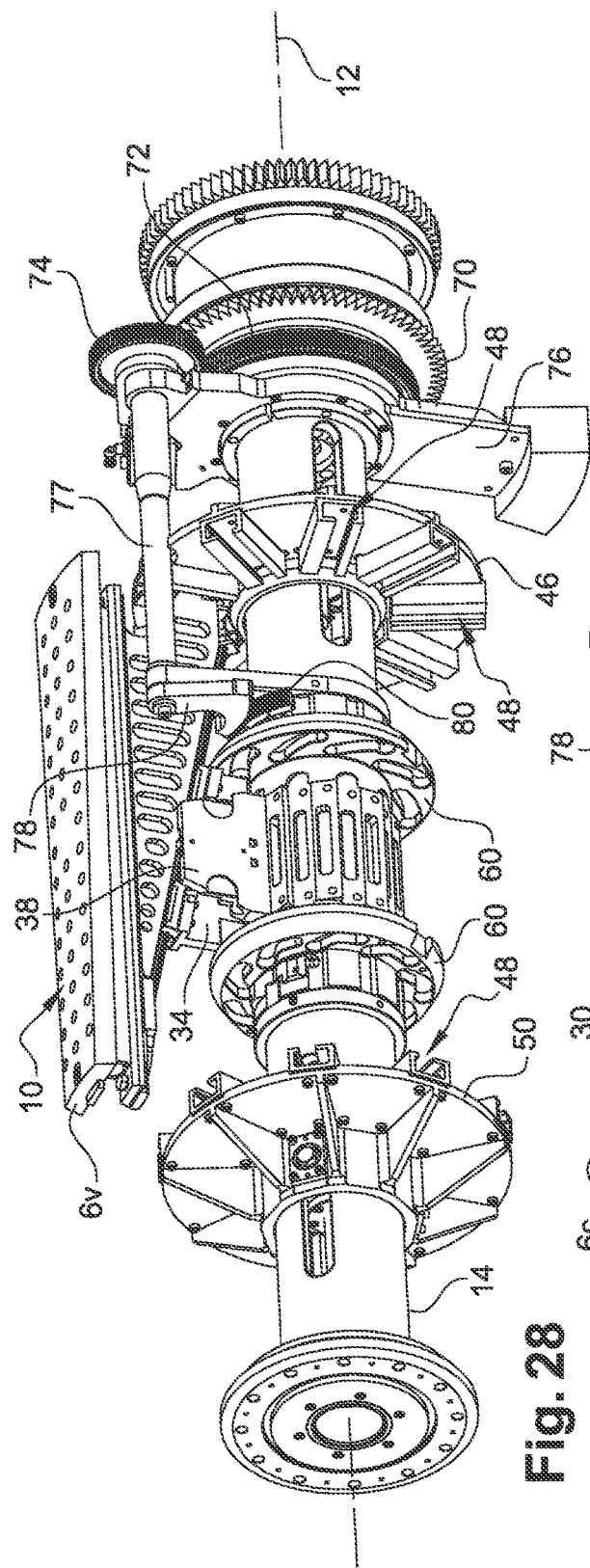
FIGS. 28 and 29 are perspective views of the central part of the drum with some components removed.
Figure 29:
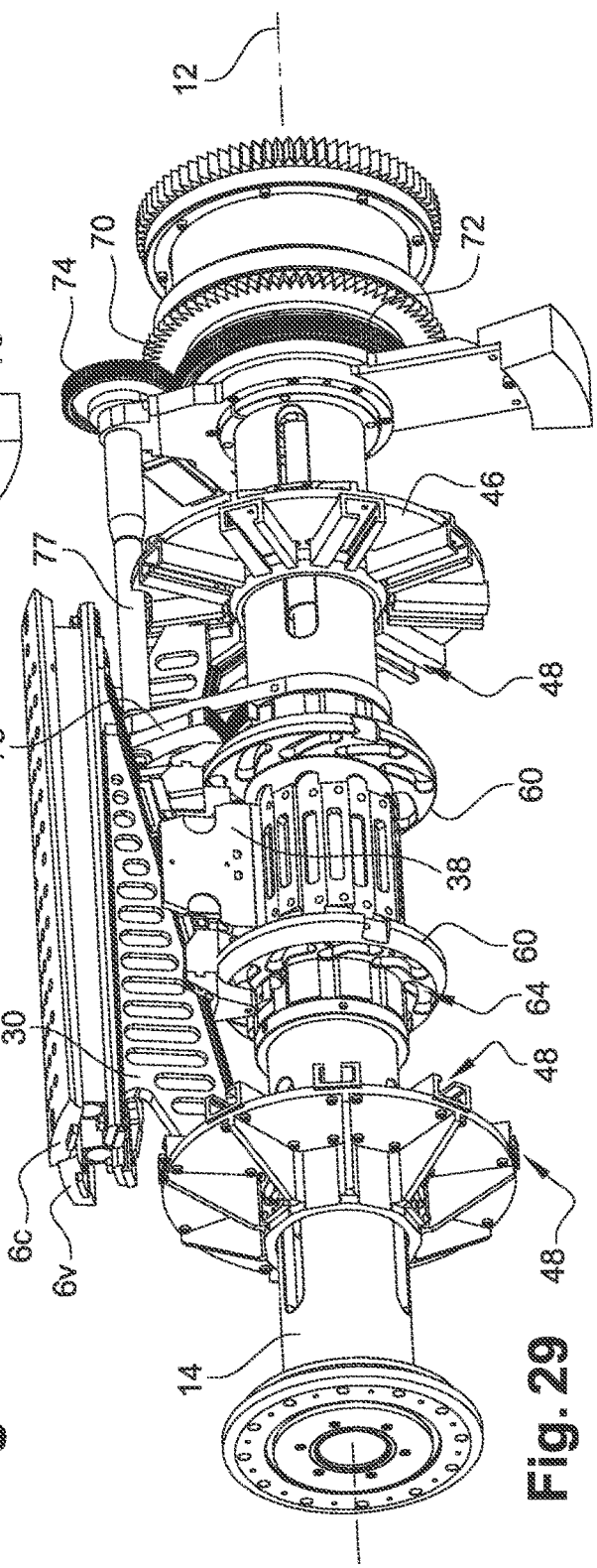

As illustrated in FIGS. 28 and 29, the drum comprises a plate 46 in the form of a disc of axis 12 that is mounted so as to be able to slide on the shaft body 14 in the axial direction. It has profile housings 48 that are open on the side of the angle brackets of the arch sectors all along the housing and at the end of the latter away from the axis. The housings receive the corresponding rollers 44. The drum comprises an analogous plate 50 that is associated with the rollers of the key sectors.

Figure 30:
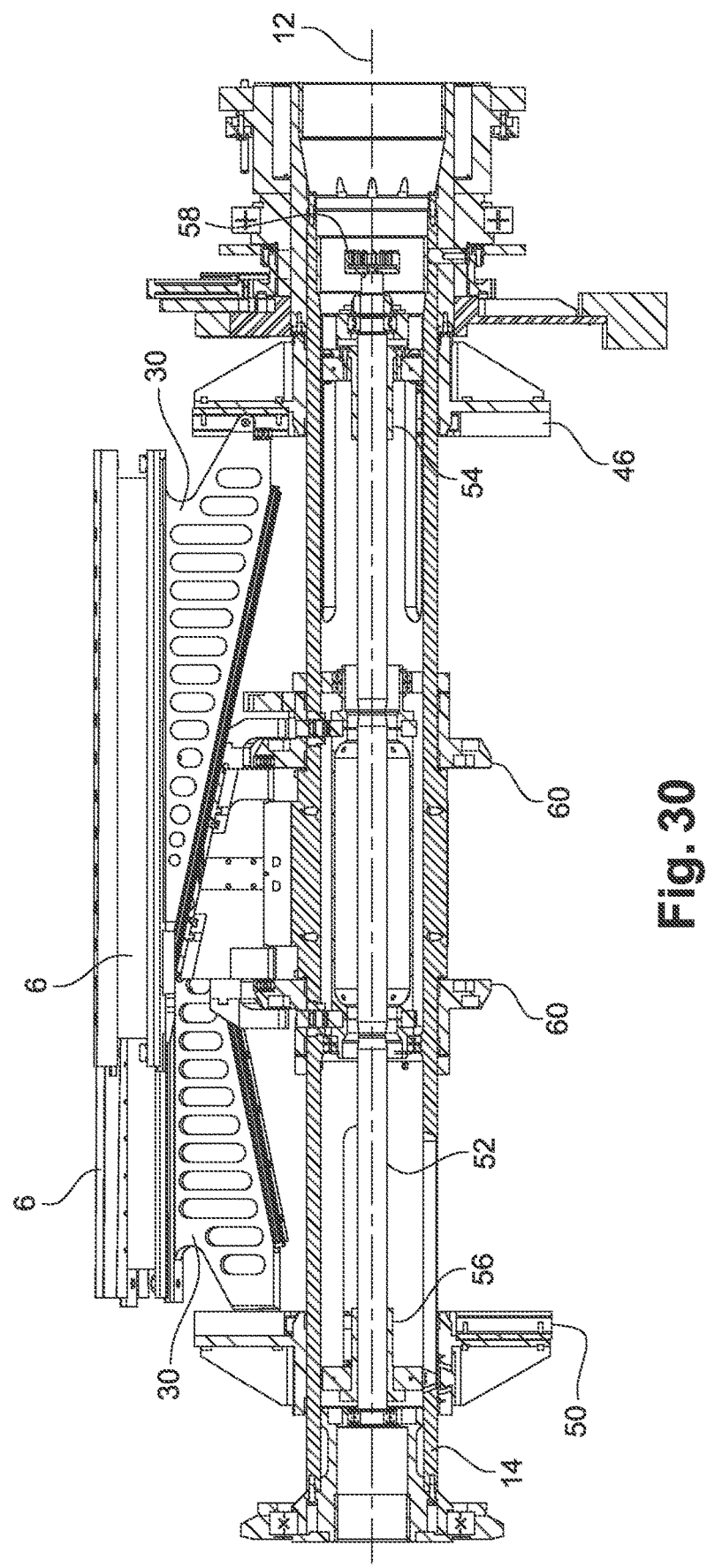
FIGS. 30 and 31 are cross-sectional views of the central part of the drum illustrating the smallest-diameter and largest-diameter configurations thereof, respectively.
Figure 31:
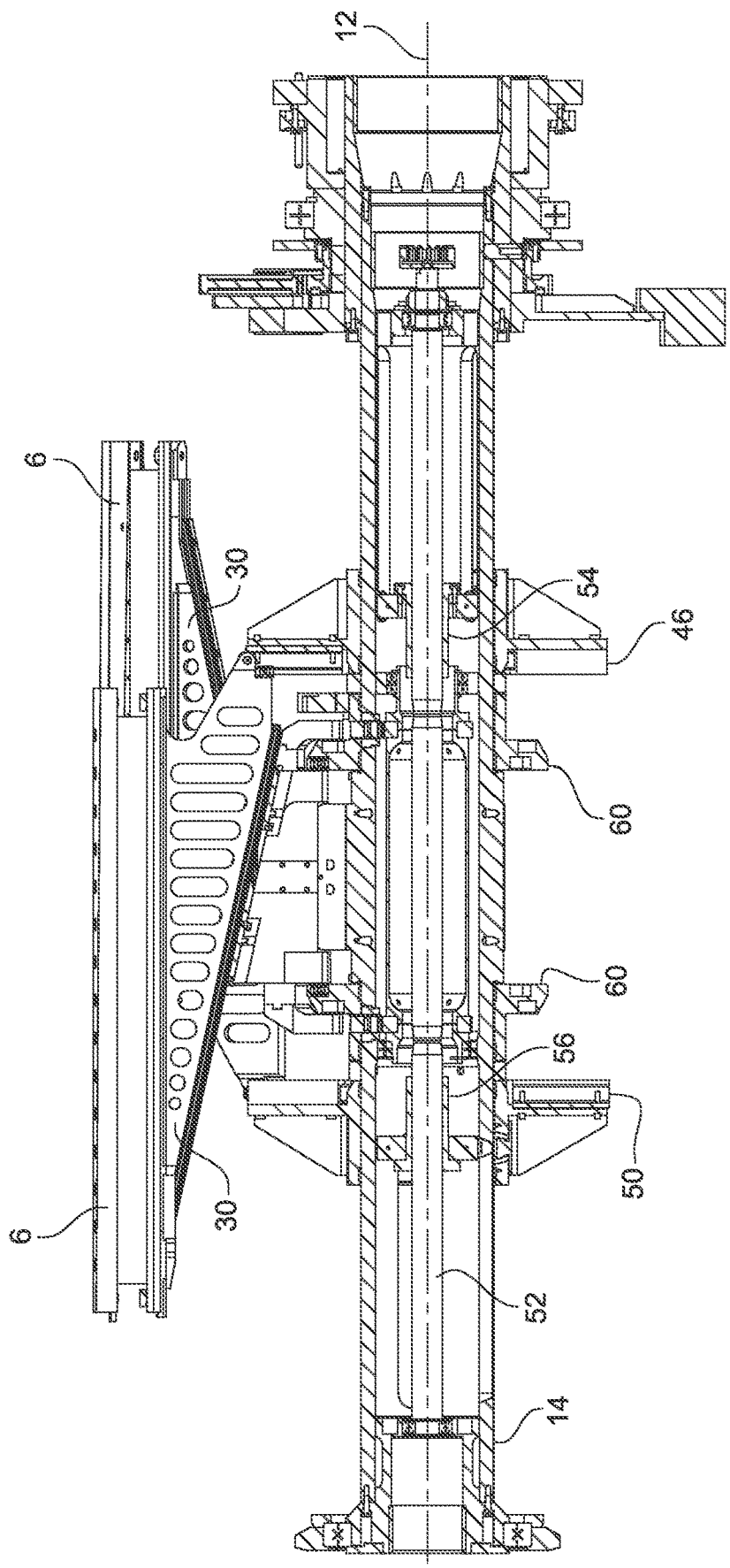

As illustrated in particular in FIGS. 30 and 31, the shaft body 14 contains a screw 52 having two regions that are threaded in opposite directions. Two nuts 54 and 56 are engaged with these respective regions and are connected rigidly to the respective plates 46, 50. The screw has, at its right-hand end in FIG. 30, a dog 58 that serves as a means for coupling to a member for rotating the screw, which has not been illustrated.

Figure 26:
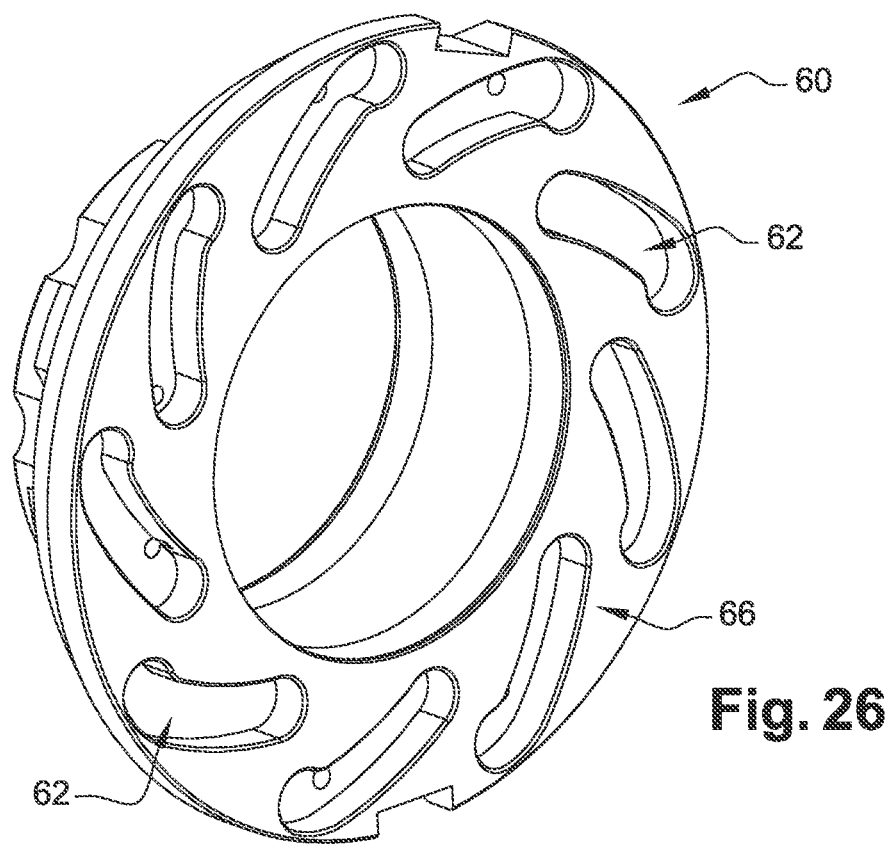
FIGS. 26 and 27 are perspective views of the two faces of one of the cams.
Figure 27:
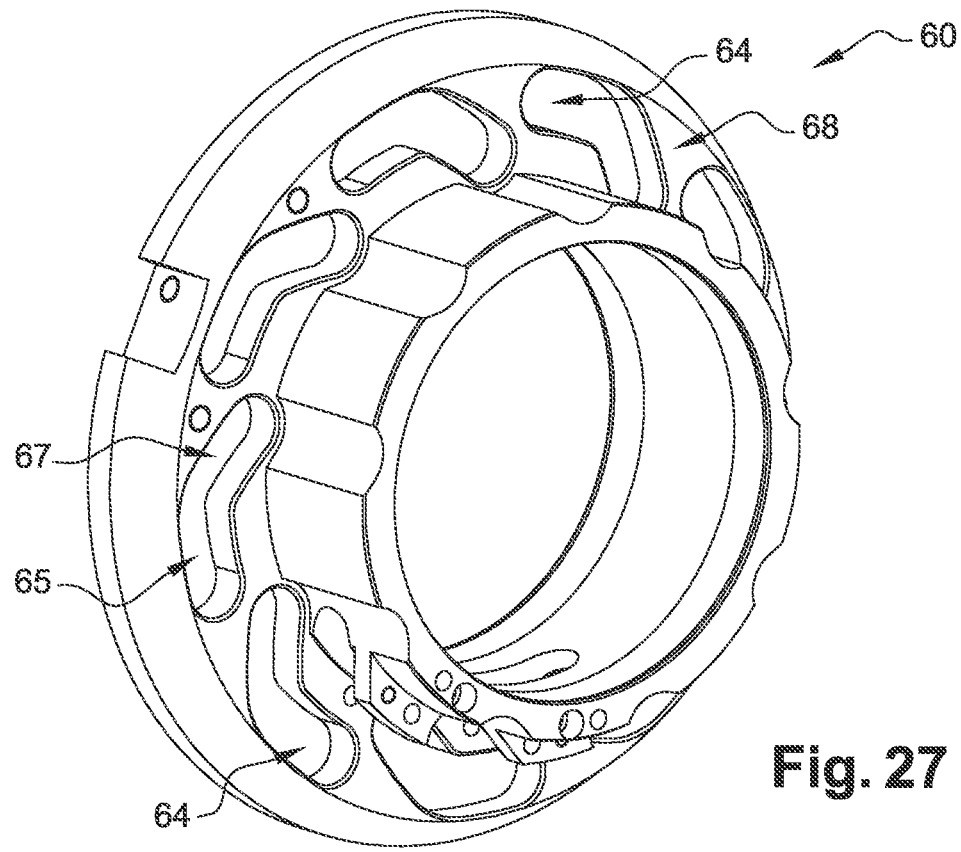

Thus, the setting in rotation of the screw 52 starting from the dog 58 causes the nut 54 and the plate 46 on one side to slide and the nut 56 and the plate 50 on the other side to slide in the opposite direction. The set of equipment formed by the plate 46 and the nut 54 carries along the angle brackets 30 and the arch sectors 6v as it slides axially. Taking the ramp into account, the latter causes the angle brackets and sectors to move in the inclined direction with respect to the axis. In the same way, the set of equipment formed by the plate 50 and the nut 56 carries along the angle brackets 30 and the key sectors 6c and causes them to move in the inclined direction with respect to the axis. Thus, in a first direction of rotation, the screw causes the key sectors and the arch sectors to move towards one another in the axial direction and causes the increase in the diameter of the circumferential face of the drum. This movement is shown by the succession of FIGS. 30 and 31. In the other direction of rotation, the moving apart of the plates brings about the reduction in this diameter. Thus, the diameter of the working face of the drum is adjusted in this way. The drum also comprises two two-sided cams 60. The two sides of the cam that is situated furthest to the right in FIG. 28 are illustrated in FIGS. 26 and 27. The two cams are rigidly secured to one another and mounted so as to be able to rotate freely on the shaft body 14 about the axis 12 without being able to slide along the latter. Each two-sided cam comprises a disc having grooves or ramps 62, 64 on its respective faces 66, 68. The two cams are symmetric to one another with respect to a plane perpendicular to the axis 12, the faces 66 being oriented towards one another. The grooves 62 in these faces receive the respective rollers 40 associated with the arch sectors. The grooves 64 in the other faces 68 receive those corresponding to the key sectors 6v. On the cam in FIGS. 26 and 27, the grooves 62 are identical to one another. The same goes for the grooves 64. Each groove 62 has a very short portion in the form of an arc of a circle of axis 12 that is contiguous with the edge of the disc, and a main portion in the form of an arc of a circle, the portion extending towards the axis. Each groove 64 comprises two portions 65, 67 of approximately the same length, both in the form of an arc of a circle. The first 65 is situated at the edge of the disc and is centred on the axis 12, while the second extends towards the axis 12.

The shaft body carries a wheel 70 and a pinion 72 that are rigidly secured to one another and are both mounted so as to be able to rotate with respect to the shaft body about the axis 12. The drum also has a pinion 74 that is mounted so as to be able to rotate about an axis parallel to the axis 12 but is separate from the latter and is carried by an arm 76 that is itself carried by the shaft body 14. A shaft 77 is rigidly secured to the pinion 74 and to a toothed sector 78 engaged with another toothed sector 80 that is rigidly secured to the cams 60.

When a pinion outside the drum engages with the wheel 70 in order to turn it, this causes the pinion 72, the wheel 74 and the two toothed sectors to rotate with the cams 60. Given the shape of the grooves 62, the arch sectors 6v are driven in the direction of the axis by the sector holder sliding on the mounting plate. During this time, the rollers 42 associated with the key sectors travel across the external first portion 65 of the grooves 64. Given the shape of this portion, these sectors maintain an unchanged radial position. The drum thus passes from the configuration in FIG. 5 into that in FIG. 6.

During the second phase of the rotation of the cams in the same direction, the arch sectors continue to move radially towards one another and simultaneously the key sectors start to move towards one another since the corresponding rollers 42 now come into engagement with the other portion 67 of the grooves 64. The key sectors and the arch sectors are then moved simultaneously in the direction of the axis. The drum thus arrives in the configuration in FIG. 7. This operation of collapsing the sectors is possible regardless of adjusted diameter of the drum, except for if this diameter is too small to allow the radial movement of the sectors.

Provision can also be made for each ramp of the cams to be made such that, for a constant speed of rotation of the cam, the speed of movement of the sectors is rendered variable, for example progressive or less at the end of collapsing or extension travel, in order to reduce jolts.

Figure 20:
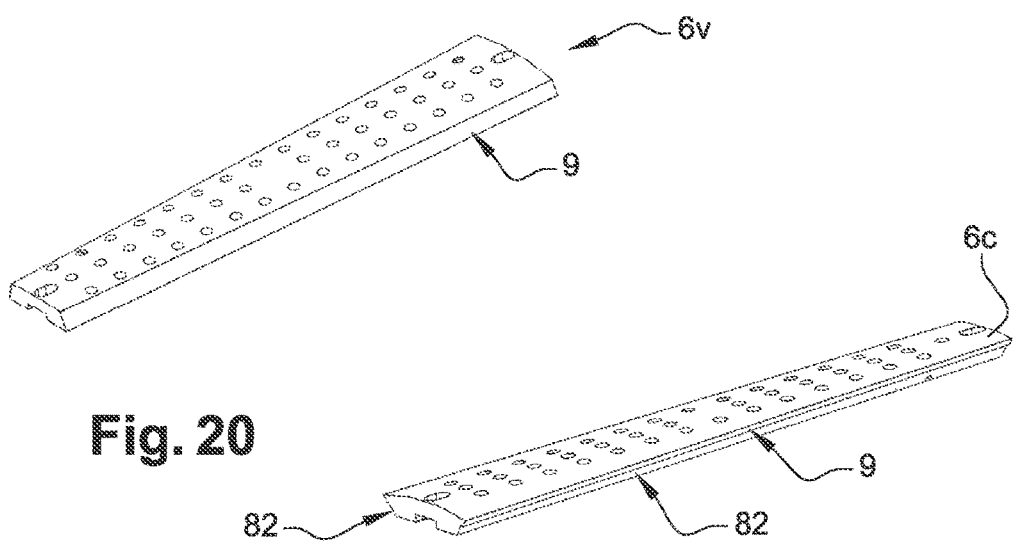
Figure 21:
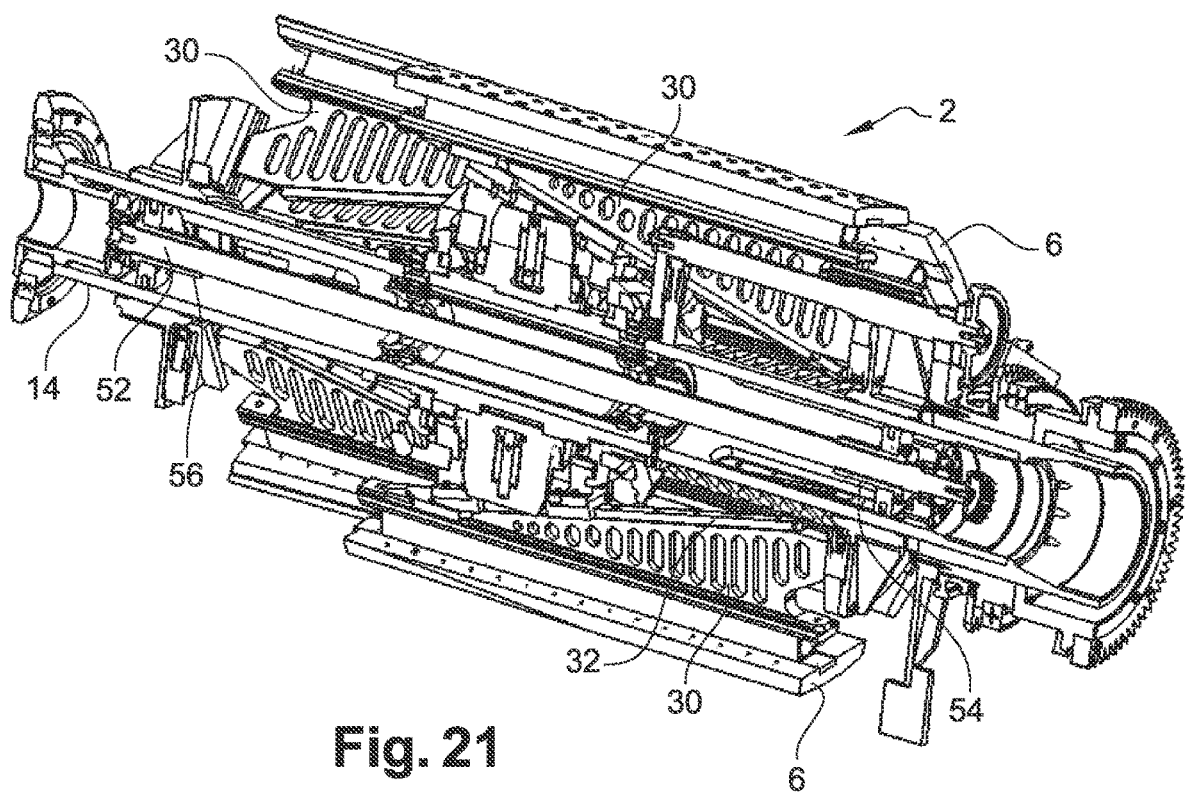
FIG. 21 is a perspective and cross-sectional view of the drum in FIG. 19.
Figure 22:
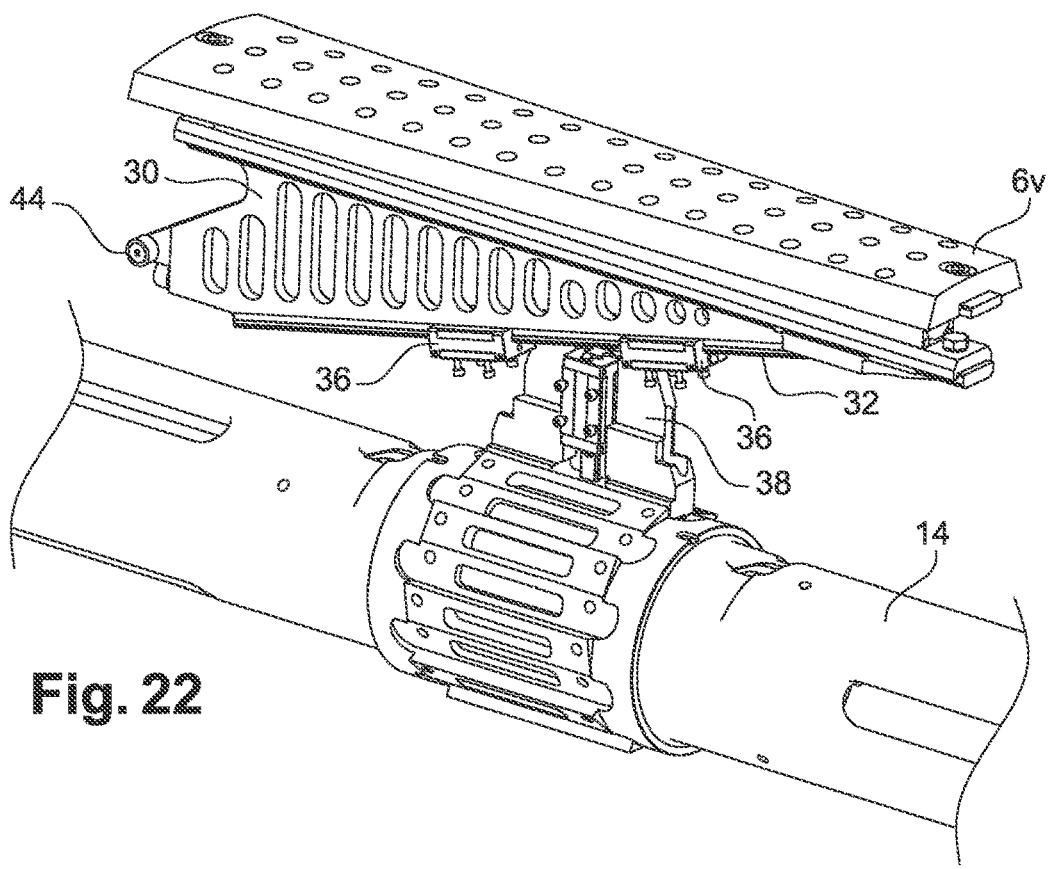
Figure 23:
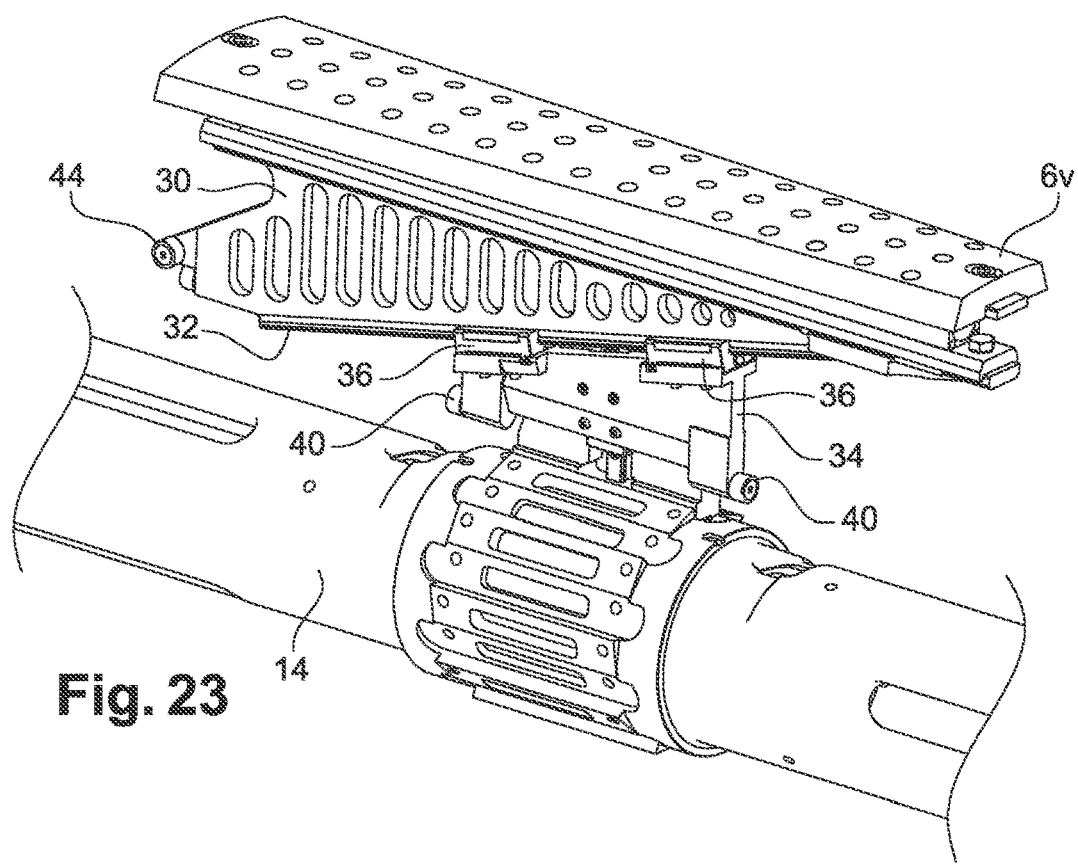

As illustrated in particular in FIG. 20, the key sectors have, under each of their side faces 9, a depression or step 82 which allows them to receive a part of the arch sectors after the start of the radial movement of the latter. The continuation of the movement of the two types of sectors can thus be carried out with the arch sectors partially housed in the depressions. This depression makes it possible to avoid moving the arch sectors over an excessively long radial travel in the first phase and thus makes it possible to reduce cycle times.

In the position in FIG. 7, it is easy to remove the tread from the drum by means of a suitable tool. Once this removal has been carried out, the mechanism is actuated in the opposite direction in order to return the sectors to their starting position.

The two mechanisms, which allow adjustment of the diameter and collapsing, respectively, are fully independent. Thus, during a change in dimension comprising adjustment to a new diameter, it is advantageously possible to start by collapsing the form in order that the sectors are no longer in contact with one another, in order to be able to move them freely and not to prematurely wear out the faces 9.

As was seen above, the drum 2 comprises eighteen sectors (6c, 6v). This number of sectors was chosen to obtain "discretization" of the external surface of the drum that is as small as possible, in order to obtain the best possible geometrical regularity (cylindricity and continuity of the surface) over the entire diameter adjusting range, which extends in this case over 100 mm. Thus, the higher the number of sectors, the more the influence of irregularities in the circumferential surface of the drum is reduced with respect to the uniformity of the tire casing which is manufactured on top. The embodiment described results in a compromise between the greatest number of possible sectors, the complexity for housing the mechanisms for controlling the various movements of the sectors, and thus the price. To this end, the number of eighteen sectors can be considered too high to be able to house eighteen ramps on the same face of a control cam, at the very least on a cam having a diameter limited by the other elements of the drum. It is for this reason that the drum 2 comprises two one-piece two-sided cams 60 having eighteen ramps 62, 64, nine ramps on each side. The use of two-sided cams makes it possible to limit the size and the number of elements that are necessary to control this drum 2 having a useful diameter equal to 500 mm.

Of course, numerous modifications can be made to the invention without departing from the scope thereof.

The mechanisms that allow the arch sectors to descend first followed by the simultaneous descent of the key sectors and the arch sectors during one and the same movement of a cam are applicable to other types of drum and for example the one in the abovementioned application WO 2013/054051.

The invention claimed is:

1. A drum for building a green tire casing, comprising:
a plurality of sectors that form a circumferential face of the drum,
said plurality of sectors including a first set of sectors and a second set of sectors,
a cam with a first face and a second face for controlling a radial movement of the plurality of sectors with respect to a rotation axis of the drum,
the cam being designed such that a monotonous movement of the cam first of all causes the radial movement of the first set of sectors by virtue of ramps solely situated on the first face without modifying a radial position of the second set of sectors, and then causes the radial movement of the second set of sectors by virtue of ramps solely situated on the second face, the radial movement of all of the plurality of sectors then being simultaneous.

2. The drum according to claim 1, wherein the first set of sectors are of a first type and wherein the second set of sectors are of a second type that are able to bear in the radial direction against the first set of sectors of the first type, the cam being designed such that the first set of sectors of the first type are moved by virtue of the ramps situated on the first face of the cam, and the second set of sectors of the second type being moved by virtue of the ramps situated on the second face of the cam.

3. The drum according to claim 2, wherein the first set of sectors of the first type, after they have started to be moved by the cam, are receivable in depressions formed in the second set of sectors of the second type.

4. The drum according to claim 1, wherein the ramps situated on the first face of the cam have a portion in the form of an arc of a circle that is coaxial with a rotation axis of the cam.

5. The drum according to claim 1, wherein the cam is a first cam and further including a second cam.

6. A drum for building a green tire casing, comprising:
a plurality of sectors that form a circumferential face of the drum,
said plurality of sectors including a first set of sectors and a second set of sectors,
a cam for controlling a radial movement of the plurality of sectors with respect to a rotation axis of the drum,
the cam having at least two main faces including a first main face and a second main face and the cam being designed such that a monotonous movement of the cam first of all causes the radial movement of the first set of sectors by virtue of ramps situated on the first main face without modifying a radial position of the second set of sectors, and then causes the radial movement of the second set of sectors by virtue of ramps situated on the second main face, the radial movement of all of the plurality of sectors then being simultaneous, and
wherein at least some of the plurality of sectors are mounted in a movable manner with respect to a support in a predetermined direction that is not radial with respect to a rotation axis and intersects the rotation axis.

7. A drum for building a green tire casing, comprising:
a plurality of sectors that form a circumferential face of the drum,
the plurality of sectors including a first set of sectors and a second set of sectors,
a cam for controlling a radial movement of the plurality of sectors with respect to a rotation axis of the drum,
the cam having at least two main faces including a first main face and a second main face and the cam being designed such that a monotonous movement of the cam first of all causes the radial movement of the first set of sectors by virtue of ramps situated on the first main face without modifying a radial position of the second set of sectors, and then causes the radial movement of the second set of sectors by virtue of ramps situated on the second face, the radial movement of all of the plurality of sectors then being simultaneous, and
further including at least one set of equipment that is mounted in a sliding manner with respect to a support in the direction of a rotation axis and is connected to at least some of the plurality of sectors.

8. The drum according to claim 1, wherein the plurality of sectors are contiguous in the circumferential direction.

9. The drum according to claim 1, wherein each sector of the plurality of sectors has two flat main side faces that are designed to be located next to homologous faces of adjacent ones of the plurality of sectors.

10. The drum according to claim 1, wherein at least some of the plurality of sectors have an outer face that has a contour with a trapezoidal overall shape.

11. A method for manufacturing a tire casing, wherein at least a part of a tread of a green form of the casing is assembled on a drum in accordance with claim 1.

\* \* \* \* \*